(Model.)

G. H. BAMFORD.
INSERTIBLE SAW TOOTH.

No. 302,375. Patented July 22, 1884.

WITNESSES.

Horatio N Barlow
Charles B. Case

INVENTOR.

George H Bamford

UNITED STATES PATENT OFFICE.

GEORGE H. BAMFORD, OF TRENTON, NEW JERSEY.

INSERTIBLE SAW-TOOTH.

SPECIFICATION forming part of Letters Patent No. 302,375, dated July 22, 1884.

Application filed January 25, 1884. (Model.)

*To all whom it may concern:*

Be it known that I, GEORGE H. BAMFORD, a citizen of the United States, residing at Trenton, in the county of Mercer and State of New Jersey, have invented a certain new and useful Improvement in Saw-Teeth, of which the following is a specification.

My invention relates to improvements in that class of saw-teeth which are detachable from the blade or body of the saw, and is shown more clearly in the accompanying drawings, in which similar letters of reference indicate similar parts.

I am aware that detachable or insertible saw-teeth are not new. They have been in use many years, and various Letters Patent for teeth of different form and fastened in the blade or body of the saw by various contrivances have been issued; but by my invention I am enabled to obtain advantages in the easier construction of the saw and teeth and in the firmer fastening of the teeth in place, which cannot be obtained by any of the old methods. Letters Patent No. 205,042 show an insertible tooth. In this, however, the beveled inner periphery of the tooth-socket is interrupted by a lug or projection, against which a screw engages to prevent the loosening of the teeth. These sockets require two operations of the cutters to form, as the first operation is interrupted by the lug. Letters Patent No. 289,715 also show an insertible tooth. This tooth is held in place by the expanding of its lower end by means of a rivet firmly driven into a hole left for that purpose at the bottom of the slot. It is difficult to thus expand the tooth without breaking it opposite the slot, unless that part of the tooth is left untempered, and if left untempered and soft that part of the tooth will, by blows given the cutting part of the tooth in swaging, become battered and the tooth become loose. Letters Patent No. 107,593 also show a socket, the beveled inner periphery of which is interrupted by a lug or projection. This is subject to the same objections as is the socket shown in Letters Patent No. 205,042. By my invention I avoid all of these evils and provide a tooth capable of being tempered throughout, held in place by simple means, and fitted into a socket easily prepared.

Figure 1:
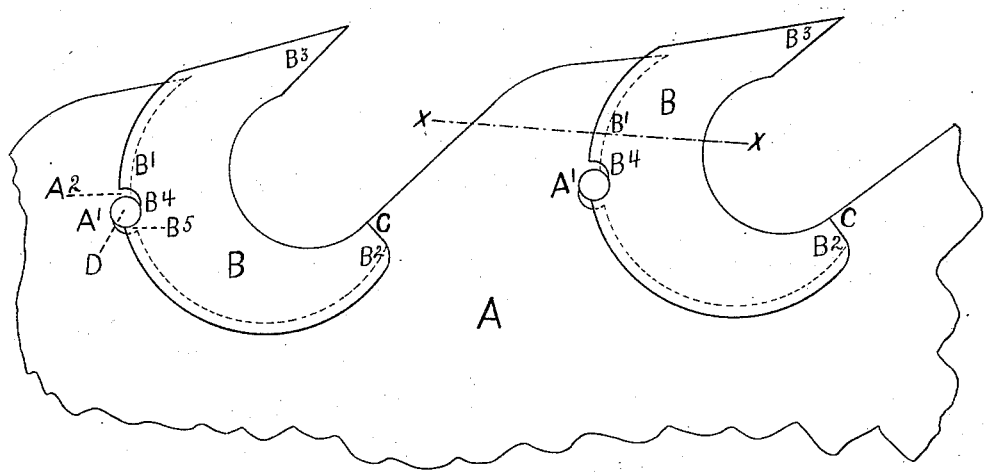
Figure 2:

In the drawings, Figure 1 shows a section of a blade or body of a saw provided with two of my teeth in place in their sockets, and Fig. 2 is a cross-section of Fig. 1 taken at the dotted line X X, showing the bevels of the saw-blade and of the tooth. These bevels are also shown in Fig. 1 by the curved dotted lines on each tooth.

A is the section of the blade, and B B are the teeth. The sockets for the teeth are circular in shape to the shoulder C, and are provided with a double-beveled inner periphery, as shown by the cross-section, Fig. 2. It will be readily seen that they can be easily formed with one operation of one pair of cutters. The teeth are provided at the back with a V-shaped groove exactly corresponding in shape with the double-beveled edge of the socket, and as shown at cross-section, Fig. 2. This groove commences at the back of the cutting part of the tooth and runs, as is indicated by the dotted lines B', from thence around the circumference of the entire remainder of the tooth. It will be seen that to insert the tooth in the socket it must be placed therein with the neck $B^2$ of the tooth some distance from the shoulder C of the socket, and then rotating the tooth as if upon its own axis until the neck $B^2$ reaches and bears against the shoulder C. It will be also seen that in use the pressure against the cutting part $B^3$ of the tooth is communicated through the tooth to the neck $B^2$, and presses this part of the tooth firmly against the shoulder C, resulting in the fact that the harder the saw is worked the firmer is the tooth automatically held in place. To keep the tooth at all times firmly in place I have adopted the following device, which is the important part of my invention, and which allows of the facility of construction and other advantages already spoken of: In the blade and in the inner periphery of the socket I cut out a segment, A'. In the outer circumference of the tooth and nearly opposite the segment A', but a little nearer the outer rim of the saw, I cut another segment, $B^4$. These segments together form a nearly circular hole, with the shoulder $A^2$ in the blade and the shoulder $B^5$ in the tooth, both slightly projecting into the inner circumference of the hole. Into this hole, when the tooth is in place, I drive the round plug or rivet D. This rivet presses firmly against the shoulders $A^2$ and $B^5$ and holds the tooth firmly in place at all times. The precise form of these segments is immaterial, as any form of opening which contains the shoulders embodies my invention.

I am aware that Letters Patent No. 272,319 show a circular socket; but they show no projecting shoulder either in the blade or in the tooth.

I am also aware that Letters Patent No. 49,868 show a curved socket; but such letters patent also show no projecting shoulders.

What I claim is—

1. A saw-blade provided with a tooth-socket beveled on the inner edge, and the segment A', with projecting shoulder A$^2$, in combination with the tooth B, having a groove into which such beveled edge enters, and provided with the segment B$^4$ and projecting shoulder B$^5$, and rivet D, all substantially as shown and described.

2. Means for holding an insertible saw-tooth in position in the saw-blade, consisting of the segment A', cut in the blade, and provided with the projecting shoulder A$^2$, and of the corresponding segment, B$^4$, cut in the tooth, and provided with the projecting shoulder B$^5$, and of the plug or rivet D, bearing against such projecting shoulders A$^2$ and B$^5$, all substantially as shown and described.

GEORGE H. BAMFORD.

Witnesses:
HORATIO N. BARTON,
CHARLES B. CASE.